United States Patent
Koeppel et al.

(10) Patent No.: US 10,176,414 B1
(45) Date of Patent: Jan. 8, 2019

(54) BATTERY CHARGER FOR A TRANSACTION CARD

(71) Applicant: Capital One Services, LLC, McLean, VA (US)

(72) Inventors: Adam R. Koeppel, Washington, DC (US); Molly Johnson, Alexandria, VA (US); Tyler Locke, Washington, DC (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/119,762

(22) Filed: Aug. 31, 2018

(51) Int. Cl.
*G06K 19/07* (2006.01)

(52) U.S. Cl.
CPC .................. *G06K 19/0702* (2013.01)

(58) Field of Classification Search
CPC .................................................. G06K 19/0702
See application file for complete search history.

(56) References Cited

U.S. PATENT DOCUMENTS

| | | | |
|---|---|---|---|
| 9,010,649 B2 * | 4/2015 | Sudo | G06K 7/10237 235/487 |
| 9,072,172 B2 * | 6/2015 | Hsu | H05K 5/0086 |
| 9,679,234 B2 | 6/2017 | Wade | |
| 10,097,053 B2 * | 10/2018 | Koeppel | H02J 50/80 |
| 2008/0093467 A1 * | 4/2008 | Narendra | G06Q 20/341 235/492 |
| 2009/0236416 A1 * | 9/2009 | Morita | G06K 19/07743 235/380 |
| 2013/0050129 A1 * | 2/2013 | Liu | G06F 3/04883 345/173 |
| 2017/0352023 A1 * | 12/2017 | Kim | G06K 7/089 |
| 2018/0121906 A1 * | 5/2018 | Browand | G06Q 20/353 |

FOREIGN PATENT DOCUMENTS

WO  WO 2016/161031 A1  10/2016
WO  WO 2016/168457 A1  10/2016

\* cited by examiner

*Primary Examiner* — Seung H Lee
(74) *Attorney, Agent, or Firm* — Harrity & Harrity, LLP

(57) ABSTRACT

Examples described herein describe a battery charger for a transaction card. According to some implementations, a charging device may detect a transaction card is received within a charging slot when an integrated circuit (IC) chip of the transaction card is in contact with a charging terminal; request a user device to provide power to charge the transaction card via the charging terminal, wherein the user device is communicatively coupled to the charging terminal; receive the power from the user device; and provide the power to the transaction card to charge a battery of the transaction card.

20 Claims, 9 Drawing Sheets

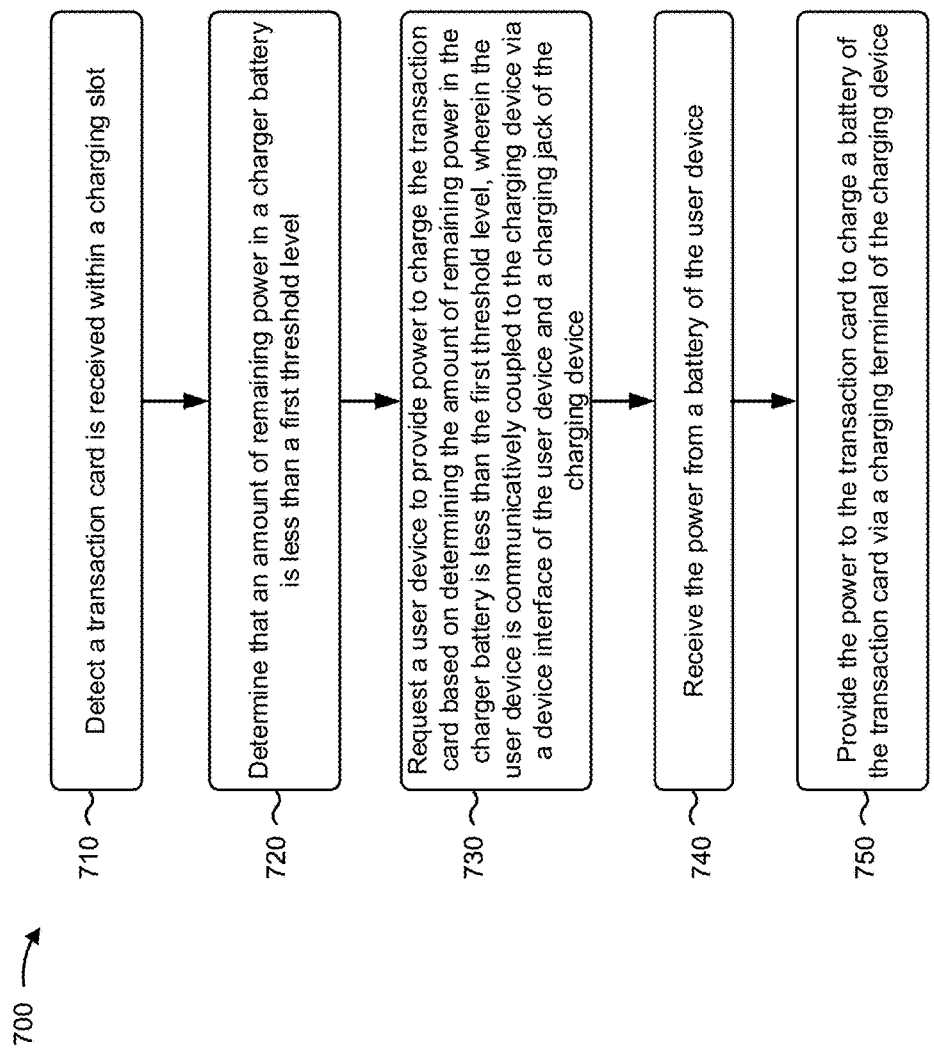

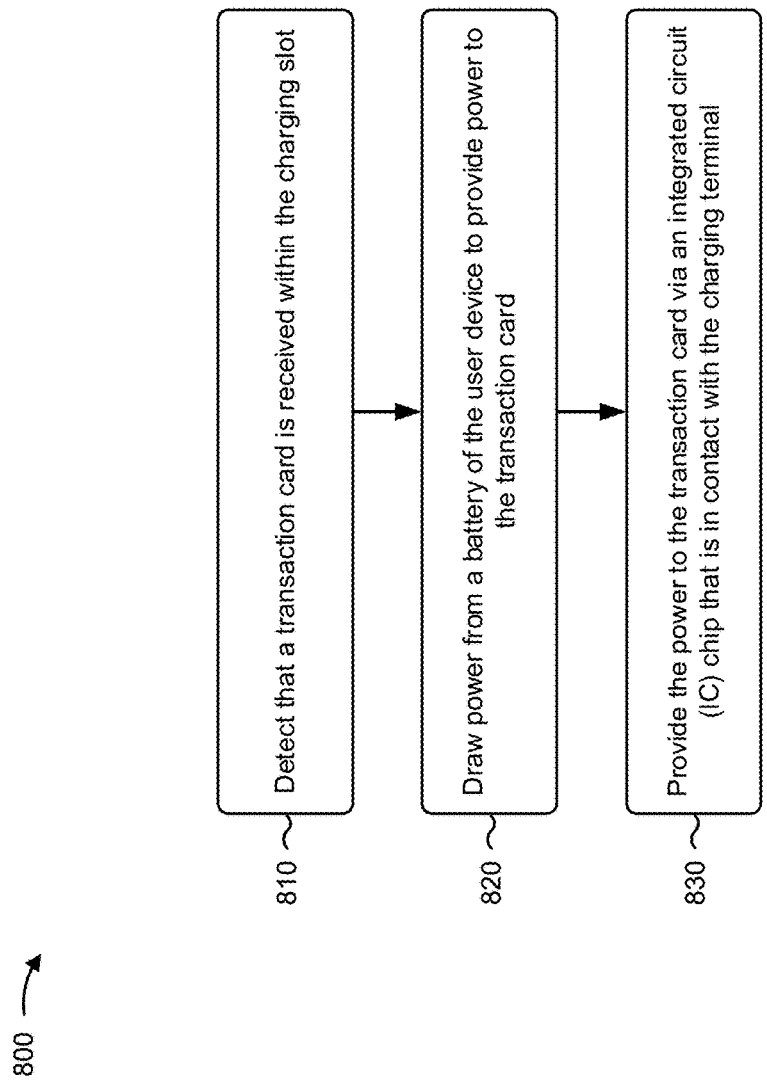

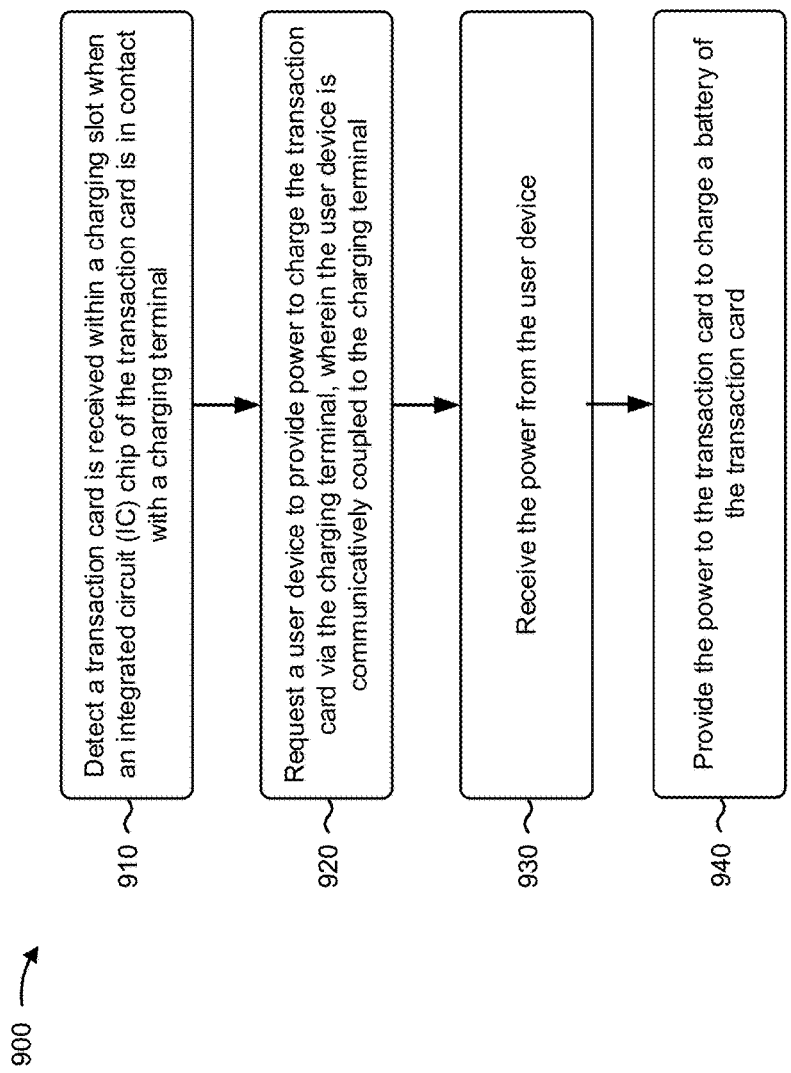

US 10,176,414 B1

BATTERY CHARGER FOR A TRANSACTION CARD

BACKGROUND

Transaction cards (e.g., credit cards, debit cards, gift cards, automated teller machine (ATM) cards, rewards cards or client loyalty cards, and/or the like) and/or devices (e.g., a smart transaction card, a smartphone, and/or the like) may be used in transactions to pay for products or services at transaction terminals (e.g., point of sale (PoS) terminals) of individuals or businesses engaged in the sale of goods or services. The transaction cards may include an integrated circuit (IC) chip to improve security with respect to use of the transaction card.

SUMMARY

According to some implementations, a method may include detecting a transaction card is received within a charging slot; determining that an amount of remaining power in a charger battery is less than a first threshold level; requesting a user device to provide power to charge the transaction card based on determining the amount of remaining power in the charger battery is less than the first threshold level, wherein the user device is communicatively coupled to the charging device via a device interface of the user device and a charging jack of the charging device; receiving the power from a battery of the user device; and providing, via the charging device, the power to the transaction card to charge a battery of the transaction card via a charging terminal of the charging device.

According to some implementations, a charging device may include a charging slot; a charging terminal; a user device holder to hold a user device; a charging jack that is to be inserted within a device interface of the user device when the user device is in the user device holder; one or more memories; and one or more processors, communicatively coupled to the one or more memories, to: detect that a transaction card is received within the charging slot; draw power from a battery of the user device to provide power to the transaction card; and provide the power to the transaction card via an integrated circuit (IC) chip that is in contact with the charging terminal.

According to some implementations, a non-transitory computer-readable medium may store instructions that, when executed by one or more processors, cause the one or more processors to: detect a transaction card is received within a charging slot when an integrated circuit (IC) chip of the transaction card is in contact with a charging terminal; request a user device to provide power to charge the transaction card via the charging terminal, wherein the user device is communicatively coupled to the charging terminal; receive the power from the user device; and provide the power to the transaction card to charge a battery of the transaction card.

BRIEF DESCRIPTION OF THE DRAWINGS

FIGS. 7-9 are flow charts of example processes associated with a battery charger for a transaction card.

DETAILED DESCRIPTION

Figure 1:
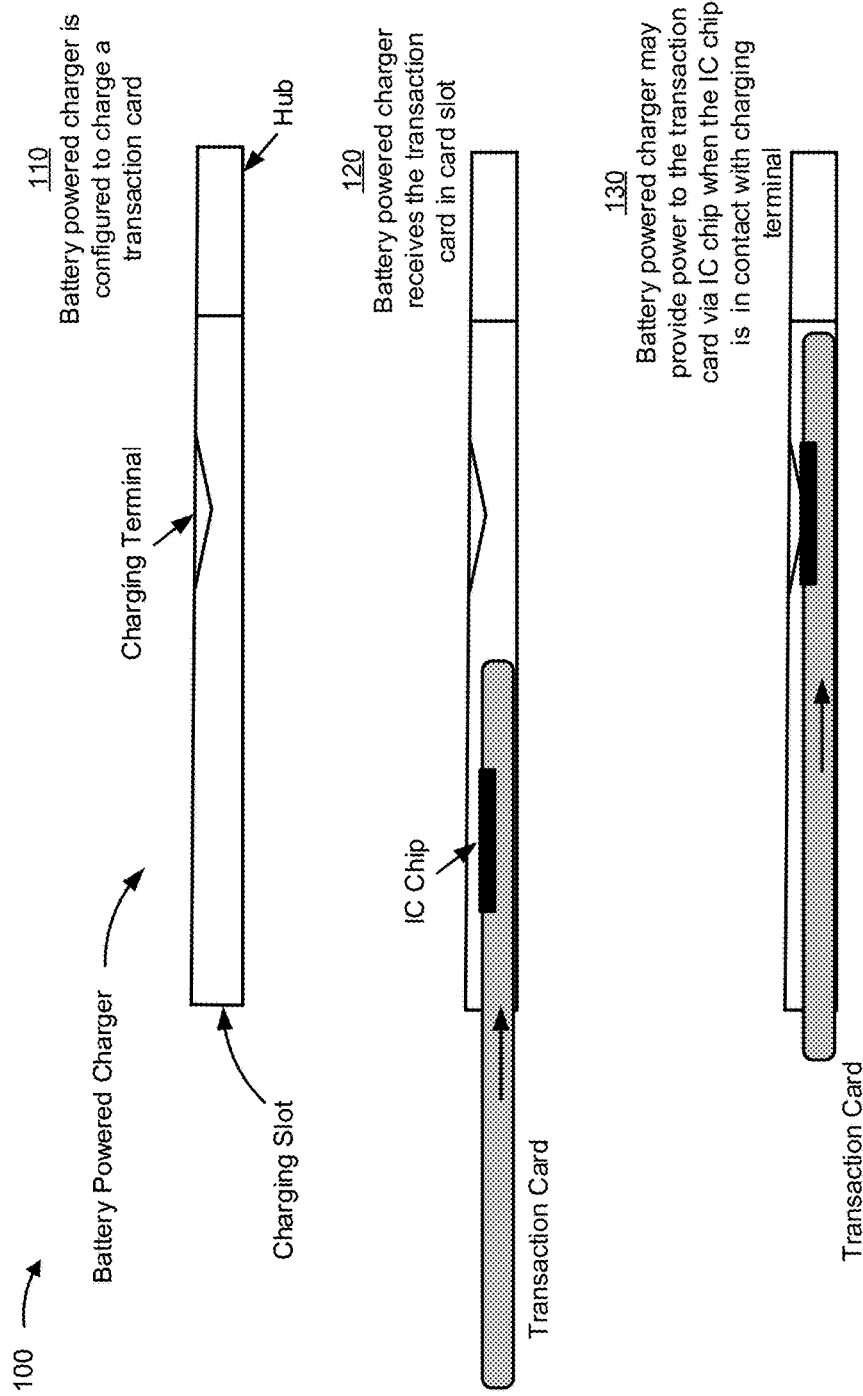
FIGS. 1-4 are diagrams of example implementations described herein.

The following detailed description of example implementations refers to the accompanying drawings. The same reference numbers in different drawings may identify the same or similar elements.

In some instances a transaction card (e.g., credit cards, debit cards, ATM cards, gift cards, loyalty cards, security key cards, and/or the like) may include an electronic circuit with components that are powered by a battery. For example, the battery may provide power to one or more communication interfaces, one or more processors, one or more user interfaces, one or more memories, one or more storage components, and/or the like of the transaction card. In some cases, the battery of the transaction card can be charged when inserted into a transaction terminal (e.g., a point of sale (POS) terminal, a security terminal, and/or the like). As such, the battery of the transaction card is to maintain a high enough level of charge between transactions to ensure functionality of the transaction card. However, if there is an extended period of time between the transaction card being used at a transaction terminal and/or if the components of the transaction card are used too frequently between uses at a transaction terminal, the battery may run out of power and the functionality of the transaction card can be lost. Furthermore, a transaction card may be configured to have a standard size. For example, financial transaction cards may be approximately 86 millimeters (mm) by 54 mm by 0.75 mm. Accordingly, a size of the battery of the transaction card is limited to a portion of those dimensions, and thus it may not be possible to enlarge a size of the battery to increase the amount of power that can be stored by the battery.

Some examples described herein provide a charging device (which may be referred to herein as a "charger") for a transaction card that can enable the transaction card to be frequently charged without use of a transaction terminal and/or without increasing the size of a battery within the transaction card. The example charging device may provide power from a battery and/or may draw power from another device, such as a user device. In some implementations, the charging device may include a case that holds a user device, such that when the transaction card and the user device are inserted or held by the charging device, a battery of the transaction card can be charged using power from a battery of the user device. In some implementations, the charging device may serve as a security apparatus to notify a user and/or a security system that the transaction card is missing. For example, if the transaction card is removed from the charging device for a threshold period of time, the charging device and/or a user device in communication with the charging device may notify a user and/or a security system that the transaction card is missing. In such cases, one or more functions of the transaction cards may be disabled (e.g., by the security system) to prevent unauthorized use of the card by an unauthorized user.

Therefore, some implementations described herein ensure that a battery of a transaction card can maintain a charge between transactions at transaction terminals, and thus ensure that the transaction card has full functionality between the transactions at the transaction terminals. As such, communication resources, processing resources, and/or the like, that may otherwise be used to access or utilize a function of the transaction card can be conserved. For example, if a user device or a transaction terminal is to attempt to access a payment token from the transaction card, some implementations described herein can ensure that the transaction card has power to provide the payment token to the user device or the transaction terminal. In such a case, communication resources and/or processing resources of the user device and/or the transaction terminal can be conserved by ensuring that the transaction card has enough power to provide the payment token and avoiding loss of functionality due to a lack of charging the battery between transactions at transaction terminals. Furthermore, processing and/or networking resources associated with recovering funds from fraudulent activity can be conserved using one or more of the example implementations described herein. For example, processing and/or networking resources used to recover funds from a transaction card that went missing and was undetected can be conserved using a charging device as described herein because the charging device can detect that the transaction card was missing and cause one or more functions of the transaction card to be disabled to prevent the fraudulent activity from occurring.

FIG. 1 is a diagram of an example implementation 100 described herein. In example implementation 100 of FIG. 1, a battery powered charger for a transaction card includes a charging slot, a charging terminal within the charging slot, and a hub. Further, example implementation 100 includes a transaction card with an integrated circuit (IC) chip (e.g., a EUROPAY®, MASTERCARD®, VISA® (EMV) chip) and a battery that powers components of the transaction card. As shown in example implementation 100, the transaction card may be inserted into the charging slot, such that the IC chip is in contact with the charging terminal, to enable a battery of the transaction card to be charged from a battery of the battery powered charger.

In some implementations, the IC chip may serve an interface for another IC chip of the transaction card. For example, the IC chip may serve as a physical interface (including a plurality of contact plates) to another IC chip on a printed circuit board (PCB) of the smart transaction card. In such cases, the IC chip may serve as a charging terminal for the PCB and/or the other IC chip on the PCB. Furthermore, in such cases, the IC chip may not include any processing capabilities (e.g., to perform a transaction similar to an EMV chip). Accordingly, the IC chip may serve as a physical interface for one or more components of the transaction card.

As shown in FIG. 1, and by reference number 110, the battery powered-charger is configured to charge the transaction card. In example implementation 100, the charging slot may be a sleeve of the battery powered charger that is configured to fit the transaction card. As such, the charging slot may be configured to be slightly larger than the transaction card, such that the transaction card fits tightly within the charging slot (e.g., to ensure that the transaction card does not fall out of the charging slot, to ensure a strong or solid contact between the IC chip and the charging terminal, and/or the like). The charging slot may be shaped such that when the transaction card is inserted into the charging slot, the IC chip is aligned with the charging terminal.

The charging terminal is positioned within the charging slot to be in contact with the IC chip when the transaction card is fully inserted into the charging slot. Accordingly, power can be supplied from a battery of the battery powered charger to the transaction card via the charging terminal and the IC chip to charge the battery of the transaction card. The charging terminal may include a supply contact and a ground contact. When the transaction card is fully inserted within the charging slot, the supply contact is positioned to be in contact with a supply pad (e.g., a pad connected to a voltage supply of a circuit of the transaction card) of the IC chip and the ground contact is positioned to be in contact with a ground pad (e.g., a ground of a circuit) of the IC chip. Accordingly, a battery of the transaction card may draw power via the supply pad and the ground pad of the IC chip when the IC chip is in contact with the charging terminal.

In some implementations, the hub of the battery powered charger may include a battery and a switching component and/or processor to facilitate charging the transaction card via the charging terminal. The hub of the battery powered charger may be configured to communicate with one or more other devices (e.g., via a transceiver) that are communicatively coupled to the battery powered charger to facilitate charging of the transaction card. For example, the hub may be configured to communicate with the transaction card. In such a case, the hub may request and/or obtain, from the transaction card, information identifying an amount of power remaining in the battery of the transaction card. The hub may obtain such information via the charging terminal and/or IC chip once the transaction card is inserted into the charging slot. Additionally, or alternatively, the hub may obtain the information via a wireless communication (e.g., a short range wireless communication, such as BLUETOOTH® communication, near field communication (NFC), and/or the like.).

In some implementations, the hub of the battery powered charger may be configured as a dedicated device for charging the transaction card. For example, the battery of the battery powered charger and the switching component and/or the processor may be configured to only provide power to the charging terminal. In such cases, the hub may not be configured to establish a communication session with other devices or the transaction card or may not be configured to perform other functions that are not related to charging a transaction card.

As further shown in FIG. 1, and by reference number 120, the battery powered charger receives the transaction card in the card slot. For example, a user may insert the transaction card into the charging slot by sliding the transaction card into the charging slot. In some implementations, the user may store the transaction card in the charging slot between transactions at transaction terminals.

In some implementations, the battery powered charger may be included within a wearable item and/or a wearable device. For example, the charging slot and/or charging terminal may be integrated into an article of clothing (e.g., shorts, pants, a shirt, a coat, under garments, and/or the like), a belt, a bag, a purse, a backpack, a wallet, a wrist band, a sleeve, an arm strap, and/or the like. Furthermore, in some implementations, the charging slot and/or charging terminal may be integrated into the wearable device. For example, the charging slot may be a pocket of the wearable device, may be included within a pocket of the wearable device, or may be included within a pocket of the wearable device. In such cases, the transaction card may be received via an opening in the pocket of the wearable device. Accordingly, in some implementations, the user may insert the transaction card into a wearable device worn on the user's person.

Once the transaction card is fully inserted into the charging slot, the IC chip of the transaction card (and/or one or more contacts of the transaction card) is capable of receiving power from the battery powered charger.

As further shown in FIG. 1, and by reference number 130, the battery powered charger may provide power to the transaction card via the IC chip and/or through contacts of an IC chip that are serving as a physical interface for an IC chip of the transaction card, when the IC chip is in contact with the charging terminal. In some implementations, the hub may determine or identify that the IC chip is in contact with the charging terminal based on a change in resistance between a supply contact and a ground contact of the charging terminal (e.g., due to the resistance of the IC chip being applied to the charging terminal while in contact with the charging terminal).

In some implementations, the battery powered charger provides power to the transaction card constantly while the IC chip is in contact with the charging terminal. Additionally, or alternatively, the battery powered charger provides power to the transaction card when an amount of power remaining in the battery of the transaction card is less than a threshold level. For example, the hub may determine an amount of power remaining in the battery of the transaction card. When the amount is less than a threshold level (e.g., 90% of capacity, 80% of capacity, 50% of capacity, and/or the like), the hub may provide power to the transaction card to charge the battery until the amount of power in the battery satisfies the threshold level (or another designated threshold charge level (e.g., max capacity, 90% capacity, and/or the like). Accordingly, the hub may determine and/or monitor the amount of power in the battery of the transaction card.

In some implementations, the battery powered charger may notify a user that the transaction card is fully charged. For example, the battery powered charger may include a user interface (e.g., a display, an indicator light (e.g., a light emitting diode (LED)), a microphone, and/or the like) that notifies the user when the transaction card is charged. Additionally, or alternatively, the battery powered charger may indicate, via the user interface, a status of the charge of the battery of the transaction card (e.g., whether the battery is currently charging, an amount of charge the battery has, and/or the like).

As described herein, the battery powered charger of example implementation 100 may charge a transaction card received into a charging slot of the battery powered charger via the charging terminal and/or the IC chip of the transaction card. Therefore, the transaction card can be charged, without the use of a transaction terminal and/or without performing a transaction via the transaction card.

As indicated above, FIG. 1 is provided merely as an example. Other examples are possible and may differ from what was described with regard to FIG. 1.

Figure 2:
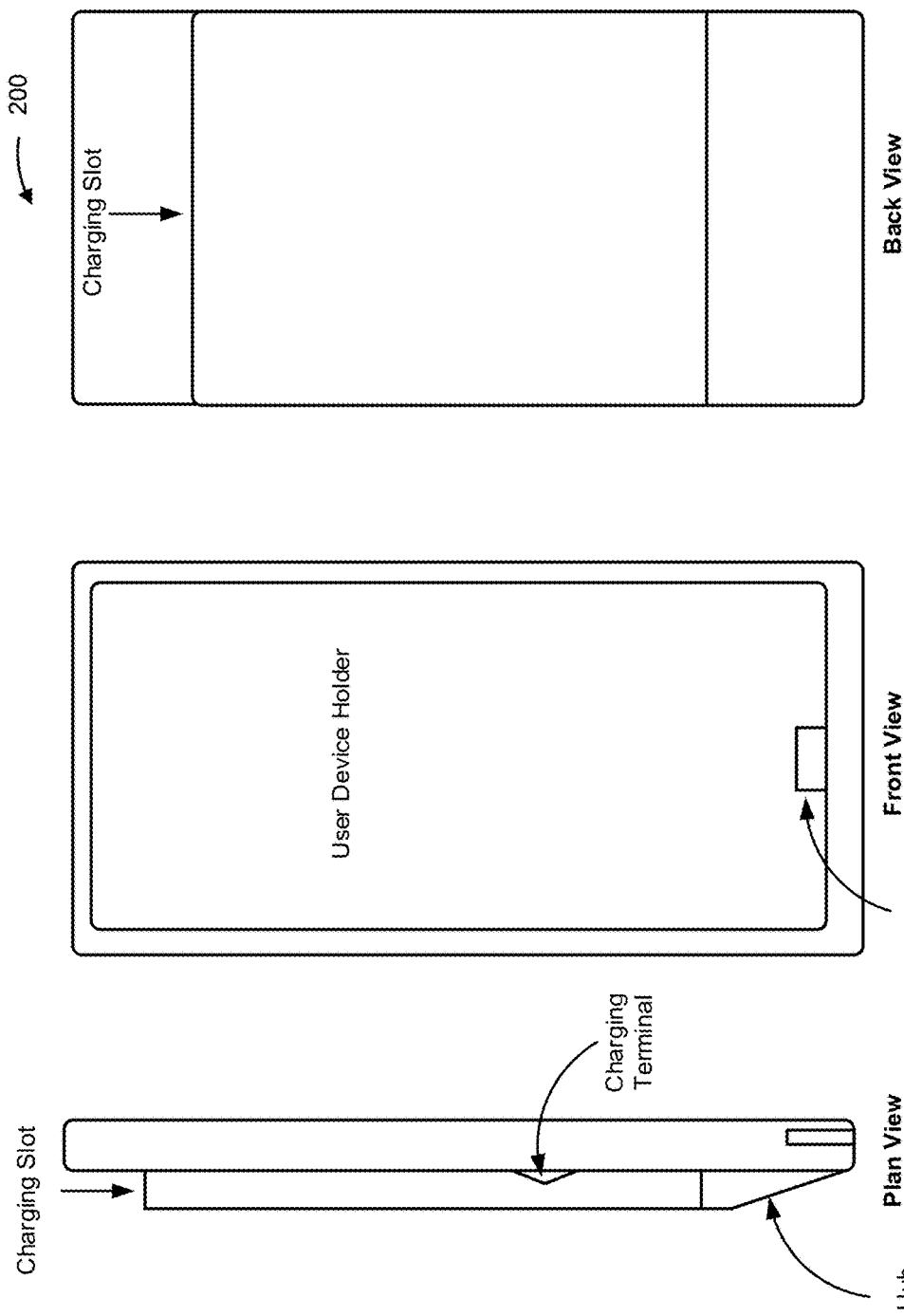

FIG. 2 is a diagram of an example implementation 200 described herein. The example implementation 200 includes a charger case with a transaction card charging slot. The charger case can hold a user device and charge a battery of a transaction card inserted into the charging slot (e.g., via a battery of the charger case and/or via a battery of the user device). As shown, the charger case includes a charging slot to receive a transaction card (similar to the charging slot of FIG. 1), a hub (similar to the hub of FIG. 1), a charging jack, and a user device holder. In some implementations, the charger case may be configured to protect the user device and/or prevent damage (e.g., scratches, cracks, and/or the like) to the user device.

The user device holder may be shaped and/or configured to hold a user device (e.g., a mobile phone, a personal digital assistant, a digital music player, a gaming device, and/or the like). For example, internal dimensions of the user device holder may closely match external dimensions of the user device such that the user device tightly fits into the user device holder. Accordingly, the charger case and/or user device holder can take various shapes to match dimensions of a particular user device that the charger case is configured to hold. In some implementations, the charger case is formed of a flexible material that can stretch to receive the user device and retract once the user device is inserted into the user device holder of the charger case to tightly hold the user device in place.

The charging jack of the charger case may include any suitable interface or connector that is to be coupled with an interface or connector of the user device when the user device is inserted into the user device holder. For example, the charging jack may include a connector (e.g., a universal serial bus (USB) connector, a LIGHTNING® connector, and/or the like) that communicatively couples the user device to the hub and/or to the charging terminal of the charger case. Accordingly, the charging jack may be any suitable connector that is configured to be coupled with a user device that fits in the user device holder of the charger case. In some implementations, the charger jack may be fixed in a position of the charger case such that charger jack is not flexible relative to the charger case. Additionally, or alternatively, the charger jack may include or be connected to a wire (e.g., a tether, a cord, and/or the like) that attaches to the hub and/or the charging terminal of the charger case to enable flexibility in the user device fitting within the user device holder and/or connecting the user device to the hub and/or charging terminal.

According to some implementations, dimensions of the charger case may correspond to dimensions of the transaction card and/or dimensions of a user device that is to be held in the charger case. For example, a width of the charger case on a front side of the charger case (e.g., the side of the charger case with the user device holder) may be the same as the width of the back side of the charger case (e.g., the side of the charger case with the charging slot). In such an example, the mobile phone and transaction card may have the same and/or similar width (e.g., within a threshold percentage).

As described herein, the charger case of example implementation 200 and/or a user device inserted in the charger case may be configured to charge a battery of a transaction card inserted into the charging slot of the charger case.

As indicated above, FIG. 2 is provided merely as an example. Other examples are possible and may differ from what was described with regard to FIG. 2.

Figure 3:
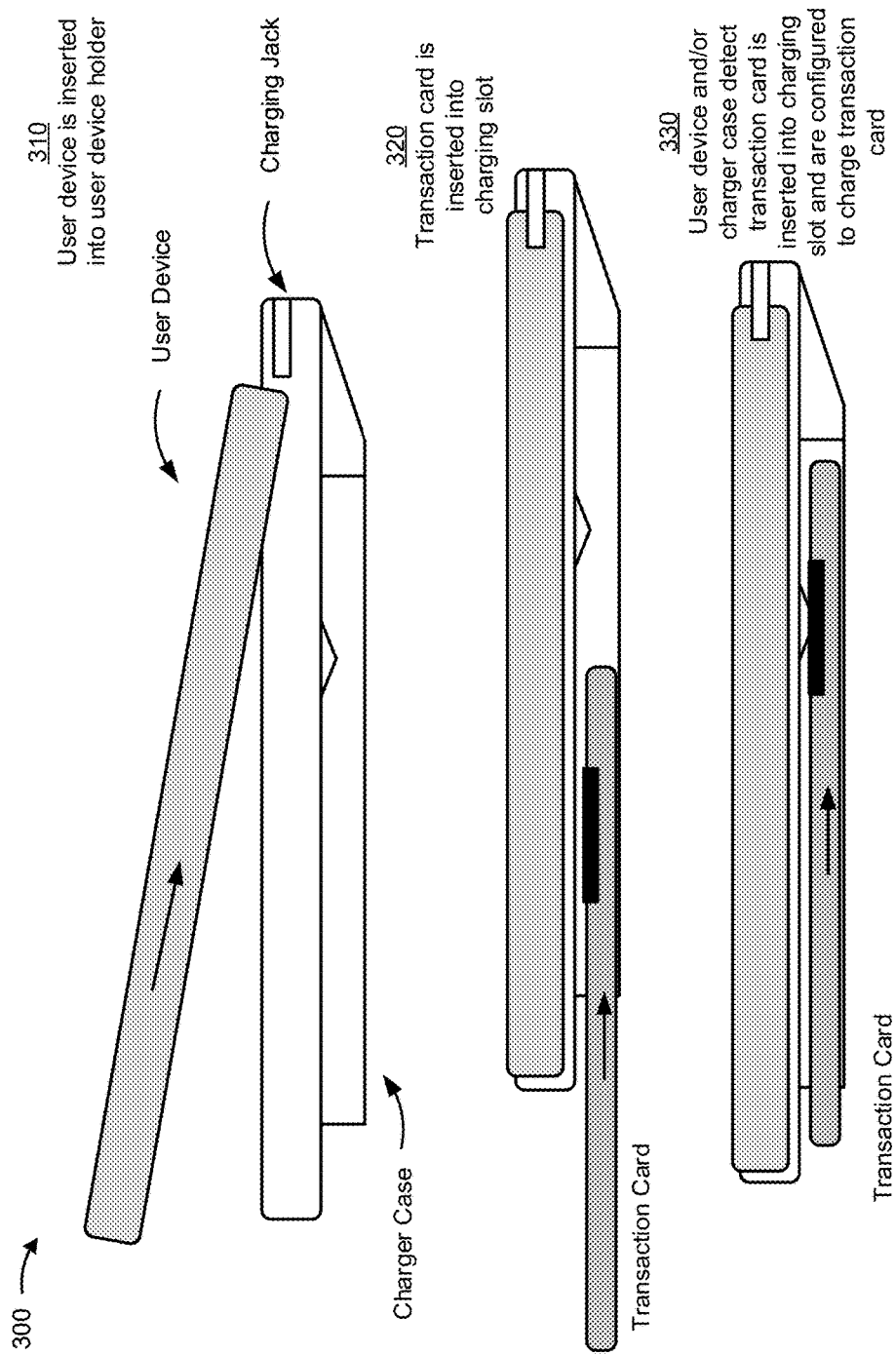

FIG. 3 is a diagram of an example implementation 300 described herein. In example implementation 300 of FIG. 3, a charger case is configured to charge a transaction card via a battery of the charger case and/or a battery of a user device. In some implementations, the user device may be configured to communicate with the charger case and/or the transaction card. For example, the user device may include and/or execute an application that enables the user device to access information from the transaction card (e.g., a battery level of the transaction card, an account number of the transaction card, a balance associated with the account of the transaction card, a user associated with the transaction card, a financial institution associated with the transaction card, and/or the like) and/or the charger case (e.g., a battery level of a battery of the charger case, whether a transaction card is inserted in the charger case, and/or the like).

As shown in FIG. 3, and by reference number 310, the user device is inserted into a holder of the charger case. For example, a user may fit the user device into the charger case to enable the charger case to charge the user device and/or enable the user device to charge a transaction card. Once within the charger case, the charging jack may be communicatively coupled with a device interface (e.g., a connector) of the user device to enable the charger case (e.g., the hub of the charger case) to draw power from the user device and/or communicate with the user device.

As further shown in FIG. 3, and by reference number 320, a transaction card is inserted into the charging slot of the charger case. The transaction card may be inserted similarly as when inserted into the charging slot of example implementation 100. In some implementations, the transaction card may be inserted into the charging slot before the user device is inserted into the user device holder of the charger case.

As further shown in FIG. 3, and by reference number 330, the user device and/or the charger case detect that the transaction card is inserted into the charging slot and are configured to charge the transaction card. Similar to the battery powered charger of example implementation 100, the charger case (e.g., via the hub) may constantly or continuously provide power to the transaction card when the transaction card is within the charging slot from a battery (e.g., a rechargeable battery) of the charger case (which may be referred to as a "charger battery"). Furthermore, the charger case and/or the user device may determine that an amount of remaining power in a battery of the transaction card is less than a threshold level, cause power to be provided from the battery of the charger case to the transaction card until an amount of power in the battery of the transaction card satisfies a threshold level, and/or the like. The charger case may cease providing power to the battery of the transaction card once a threshold level of power is reached in the battery of the transaction card.

In some implementations, the charger case may be configured to provide power to a battery of the user device. For example, in response to a request from the user device to provide power to the charger case (or based on an amount of power remaining in a battery of the user device reaching a threshold level), the user device may request the charger case to provide power to the user device. The charger case may then accept or deny the request to provide power to the user device based on whether an amount of power remaining in the battery satisfies a threshold level (e.g., 40% of capacity, 60% of capacity, and/or the like). If the amount of power remaining satisfies the threshold level, the charger case may provide power to the user device to charge the battery of the user device. On the other hand, if the amount of power remaining in the battery does not satisfy the threshold level, the charger case may not charge the battery of the user device.

In some implementations, the charger case (e.g., via the hub) may request the user device to provide power to charge the battery of the transaction card. For example, the charger case may identify that the user device is within the user device holder and/or communicatively coupled with the charging jack. The charger case may then request, via the charging jack, the user device to provide the power to charge the battery of the transaction card. In some implementations, the user device may accept or deny the request to provide the power to the charger case based on an amount of remaining power in a battery of the user device. For example, if the amount of power remaining in the battery of the user device is less than a threshold level (e.g., 10% of capacity, 20% of capacity, 40% of capacity, 50% of capacity, and/or the like), the user device may deny the request to provide power to the charger case and/or the battery of the transaction card. Accordingly, the user device may preserve limited battery power to extend the functionality or lifetime of the user device. On the other hand, if the amount of power remaining in the battery is above the threshold level, the user device may accept the request to provide the power to the charger case and/or battery of the transaction card.

Therefore, in some implementations, the charger case may await a response from the user device, and receive or draw the power from the battery of the user device if the user device accepts the request to provide the power. The charger case may then provide or forward the power to the battery of the transaction card via the charging terminal and IC chip of the transaction card. Additionally, or alternatively, the charger case (e.g., via the hub), may use the power from the battery of the user device to charge a battery of the charger case. The charger case may then use the power from the battery of the charger case to charge the battery of the transaction card.

In some implementations, the charger case may wait to request that the user device provide power to charge the battery of the transaction card until an amount of power in the battery of the charger case is less than a threshold level. For example, the charger case may determine that an amount of remaining power in the battery of the charger case is less than a threshold level and request the user device to provide power and/or draw power from the battery of the user device based on determining that the amount of remaining power in the charger battery is less than the threshold level. In some implementations, if the charger case determines that the amount of remaining power in the charger case is equal to or greater than the threshold level, then the charger case may charge the battery of the transaction card using power from the battery of the charger case.

In some implementations, the charger case may notify a user that the transaction card is fully charged. For example, the charger may include a user interface that notifies the user and/or may use the user interface of the user device to notify the user when the transaction card is charged. Additionally, or alternatively, the charger case may indicate, via the user interface of the case or the user interface of the user device, a status of the charge of the battery of the transaction card (e.g., whether the battery is currently charging, an amount of charge the battery has, and/or the like).

Accordingly, the charger case of example implementation 300 may enable a battery of a transaction card to be charged from a battery of the charger case and/or a battery of the user device held in the charger case.

As indicated above, FIG. 3 is provided merely as an example. Other examples are possible and may differ from what was described with regard to FIG. 3.

Figure 4:
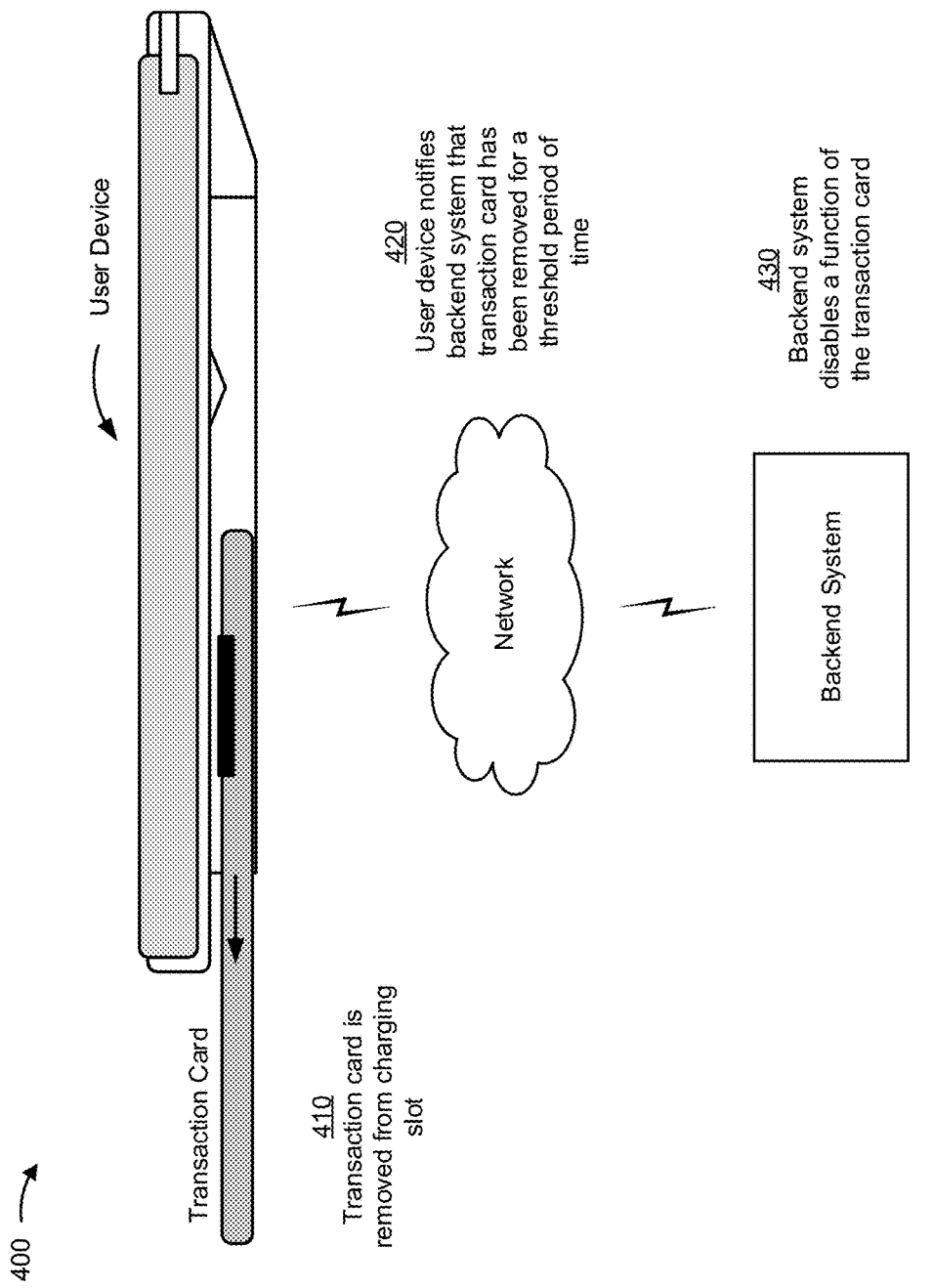

FIG. 4 is a diagram of an example implementation 400 described herein. In example implementation 400, a security system may be used to disable functionality of a transaction card if the transaction card is removed from a charging slot of a charging device (shown as a charger case in FIG. 4) for a threshold period of time.

As shown in FIG. 4, and by reference number 410, a transaction card is removed from the charging slot. For example, a user may remove the transaction card to use the transaction card at a transaction terminal. In some implementations, the charger case and/or the user device may determine that the transaction card has been removed from the charging slot based on the IC chip no longer being in contact with the charging terminal. For example, the charger case and/or the user device may detect a change in a resistance between a supply contact and a ground contact of the charging terminal (e.g., due to the resistance of the transaction card being removed when the IC chip is no longer in contact with the charging terminal).

As further shown in FIG. 4, and by reference number 420, the user device notifies a backend system that the transaction card has been removed for a threshold period of time. In some implementations, the charger case may notify the user device that the transaction card has been removed from the charging slot for the threshold period of time (e.g., 10 minutes, 20 minutes, 1 hour, and/or the like). In some implementations, the charger case may notify the user device to alert the user that the transaction card is missing. For example, the charger case may send a notification that causes the user device display an alert, sound an alarm, and/or the like. As such, the user may be notified that the transaction card is missing or not included within the charging slot.

Additionally, or alternatively, the user device may monitor the charging terminal and identify that the transaction card has been removed from the charging slot for the threshold period of time. The user device may similarly alert the user (e.g., via a user interface of the user device) that the transaction card has been removed after the threshold period of time expires.

As further shown in FIG. 4, and by reference number 430, the security system disables a function of the transaction card. For example, the security system may enable and/or disable functions (e.g., an ability to use the transaction card in a transaction, such as to pay for a product or service, access a secure location, record a loyalty purchase, redeem a reward, access features of the transaction card, access an account of the transaction card, and/or the like) of the transaction card based on the status of the transaction card (e.g., whether the transaction card is active or inactive, whether the transaction card is valid or invalid, whether an account associated with the transaction card is in good standing or not, and/or the like). As such, when the transaction card is in a known location (e.g., within the charging slot of the charger case), the security system may enable functionality of the transaction card and when the transaction card is in an unknown location (for a threshold period of time), the security system may disable functionality of the transaction card.

According to some implementations, if the transaction card is removed from the charging slot and returned to the charging slot within the threshold period of time, the charger case and/or user device may not alert the user and/or may not notify the security system to disable the functionality of the transaction card. In some implementations, if the transaction card is returned to the charging slot after the threshold period of time, the charger case and/or user device may communicate with the security system to restore the functionality of the transaction card. For example, the security system may perform a verification with the user device and/or charger case to ensure that the transaction card is in the possession of an authorized user of the account. In such cases, the security system may verify the transaction card is in the possession of an authorized user via the user device by requiring a user of the user device to answer security questions, by performing a secondary authentication process, and/or the like.

Accordingly, the charger case and/or user device may be used as a security system to monitor the presence of the transaction card and ensure that the transaction card is not lost or stolen. Accordingly, some implementation describe herein may conserve resources with respect to recovering from fraudulent transactions that may have otherwise have occurred.

As indicated above, FIG. 4 is provided merely as an example. Other examples are possible and may differ from what was described with regard to FIG. 4.

Figure 5:
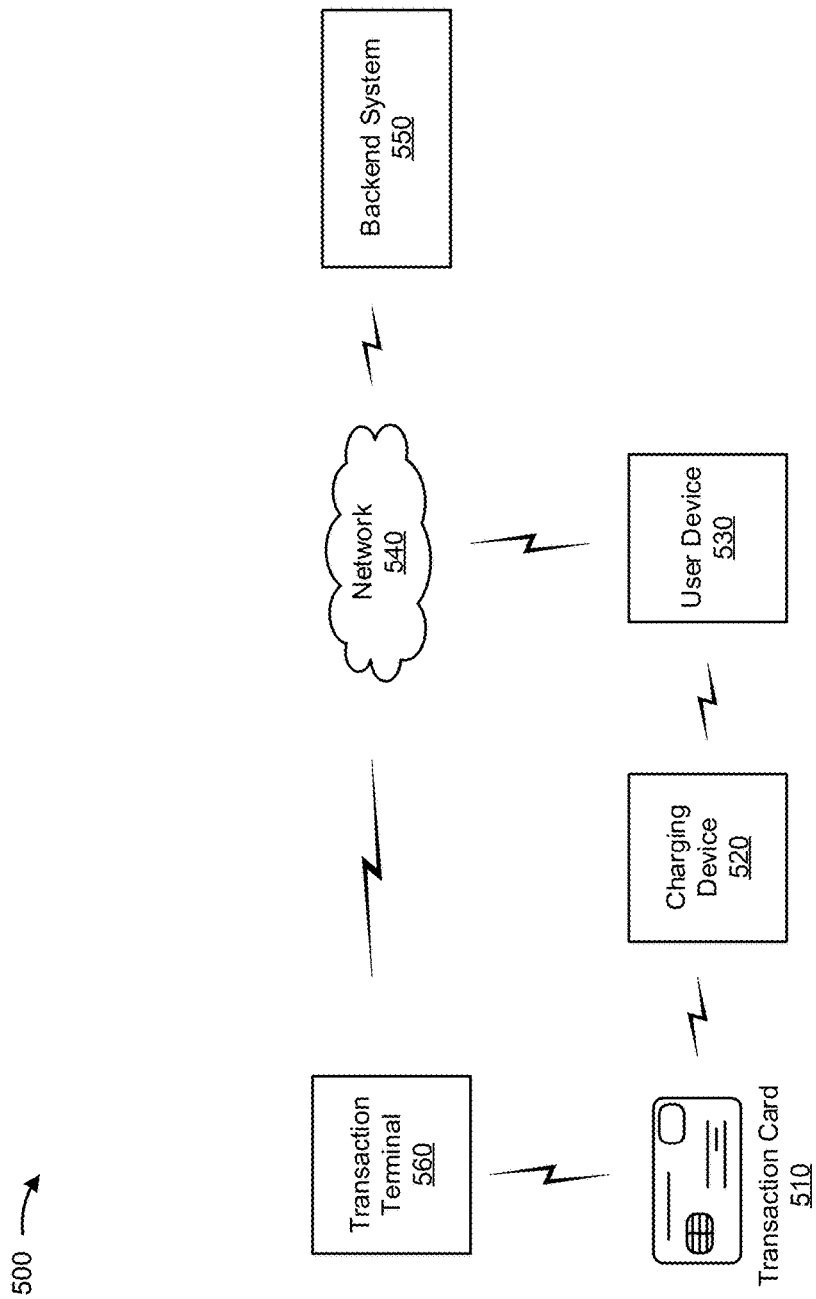
FIG. 5 is a diagram of an example environment in which systems and/or methods, described herein, may be implemented.

FIG. 5 is a diagram of an example environment 500 in which systems and/or methods, described herein, may be implemented. As shown in FIG. 5, environment 500 may include a transaction card 510, a charging device 520, a user device 530, a network 540, a backend system 550, and a transaction terminal 560. Devices of environment 500 may interconnect via wired connections, wireless connections, or a combination of wired and wireless connections.

Transaction card 510 includes a transaction card capable of communicating with the components of environment 500 (e.g., via Bluetooth communication, BLE communication, Wi-Fi communication, NFC session, and/or the like). Transaction card 510 is capable of communicating data for a transaction with transaction terminal 560. For example, transaction card 510 may communicate data including a transaction token, transaction card identification information (e.g., an account identifier, a cardholder identifier, and/or the like), account information, banking information, transaction information (e.g., a transaction token), and/or the like. For example, to communicate the data, transaction card 510 may include a magnetic strip and/or an integrated circuit (IC) chip (e.g., a EUROPAY®, MASTERCARD®, VISA® (EMV) chip). Transaction card 510 may include an antenna to communicate data associated with transaction card 510. The antenna may be a passive RF antenna, an active RF antenna, and/or a battery-assisted RF antenna. Transaction card 510 may correspond to the transaction cards of FIGS. 1-4. As described herein, a battery of transaction card 510 may be charged by charging device 520.

Charging device 520 includes a device capable of providing power to transaction card 510. Charging device 520 may include a battery, a switching component, a processor, and/or the like to facilitate charging a transaction card via the IC chip and/or through contacts of the transaction card. For example, charging device 520 may correspond and/or by implemented by the battery powered charger of FIG. 1 and/or the charger case of FIGS. 2-4. According to some implementations, charging device 520 is not configured to facilitate processing a transaction (as performed by transaction terminal 560).

User device 530 includes one or more devices capable of receiving, generating, storing, processing, and/or providing information associated with charging transaction card 510 in accordance with some implementations herein. For example, user device 530 may include a communication device and/or computing device, such as a mobile phone (e.g., a smart phone, a radiotelephone, and/or the like), a personal digital assistant, a digital music player, a gaming device, a wearable communication device (e.g., an electronic wallet device, and/or the like), or a similar type of device.

Network 540 includes one or more wired and/or wireless networks. For example, network 540 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Backend system 550 includes one or more devices capable of authorizing and/or facilitating a transaction. For example, backend system 550 may include one or more servers and/or computers to store and/or provide information (e.g., authorizations, balances, transaction tokens, security information, account information, and/or the like) associated with processing a transaction via transaction terminal 560.

Backend system 550 may include one or more devices associated with financial institutions (e.g., banks, credit unions, and/or the like) and/or transaction card associations that authorize a transaction and/or facilitate a transfer of funds or payments between an account of a cardholder of transaction card 510 and an account of an individual or business of transaction terminal 560. For example, backend system 550 may include one or more devices of one or more issuing financial institutions associated with transaction card 510, one or more devices of one or more acquiring financial institutions (or merchant banks) associated with transaction terminal 560, and/or one or more devices associated with one or more card associations (e.g., VISA®, MASTER-CARD®, and/or the like) associated with transaction card 510. Accordingly, in response to receiving transaction card data associated with transaction card 510 from transaction terminal 560, various financial institutions and/or card associations of backend system 550 may communicate to authorize the transaction and/or transfer funds between the accounts associated with transaction card 510 and/or transaction terminal 560.

Backend system 550 may include one or more devices associated with securing financial information and/or data associated with an account of transaction card 510. For example, backend system 550 may have the ability to enable and/or disable one or more functions of transaction card 510. For example, a security system of backend system 550 can deactivate transaction capabilities of transaction card 510 or reactivate transaction capabilities of transaction card 510 based on whether or not transaction card is in a charging slot of charging device 520, as described herein.

Transaction terminal 560 includes one or more devices capable of receiving, generating, storing, processing, and/or providing information associated with facilitating processing a transaction (a PoS transaction). For example, transaction terminal 560 may include a communication device and/or computing device capable of receiving data from transaction card 510 and processing a transaction based on the data. In some implementations, transaction terminal 560 may include a desktop computer, a laptop computer, a tablet computer, a handheld computer, and/or the like. Transaction terminal 560 may be owned and/or operated by one or more individuals or businesses engaged in a sale of goods or services (e.g., one or more merchants, vendors, service providers, and/or the like). Transaction terminal 560 may include a PoS terminal, a security access terminal, an ATM terminal, and/or the like.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 2 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
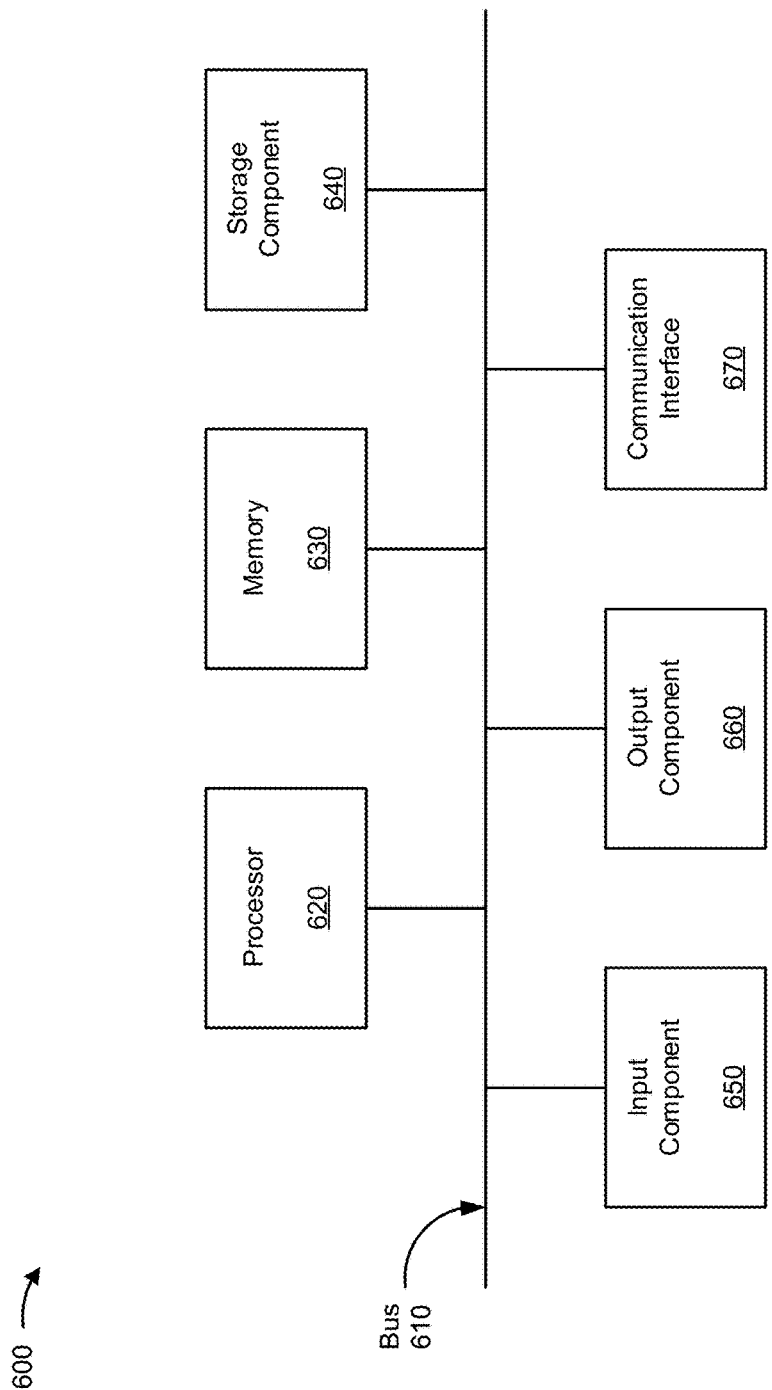
FIG. 6 is a diagram of example components of one or more devices of FIG. 5.

FIG. 6 is a diagram of example components of a device 600. Device 600 may correspond to transaction card 510, charging device 520, user device 530, backend system 550, and/or transaction terminal 560. In some implementations, transaction card 510, charging device 520, user device 530, backend system 550, and/or transaction terminal 560 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

FIG. 7 is a flow chart of an example process 700 associated with a battery charger for transaction card. In some implementations, one or more process blocks of FIG. 7 may be performed by a charging device (e.g., charging device 520). In some implementations, one or more process blocks of FIG. 7 may be performed by another device or a group of devices separate from or including charging device (e.g., charging device 520), such as a transaction card (e.g., transaction card 510), a user device (e.g., user device 530), or a backend system (e.g., backend system 550).

As shown in FIG. 7, process 700 may include detecting a transaction card is received within a charging slot (block 710). For example, the charging device (e.g., using processor 620, input component 650, communication interface 670, and/or the like) may detect the transaction card is received within the charging slot, as described above.

As shown in FIG. 7, process 700 may include determining that an amount of remaining power in a charger battery is less than a first threshold level (block 720). For example, the charging device (e.g., using processor 620, input component 650, communication interface 670, and/or the like) may determine that the amount of remaining power in the charger battery is less than the first threshold level, as described above.

As shown in FIG. 7, process 700 may include requesting a user device to provide power to charge the transaction card based on determining the amount of remaining power in the charger battery is less than the first threshold level, wherein the user device is communicatively coupled to the charging device via a device interface of the user device and a charging jack of the charging device (block 730). For example, the charging device (e.g., using processor 620, memory 630, storage component 640, input component 650, output component 660, communication interface 670, and/or the like) may request a user device to provide power to charge the transaction card based on determining the amount of remaining power in the charger battery is less than the first threshold level, as described above. In some implementations, the user device is communicatively coupled to the charging device via a device interface of the user device and a charging jack of the charging device.

As shown in FIG. 7, process 700 may include receiving the power from a battery of the user device (block 740). For example, the charging device (e.g., using processor 620, input component 650, communication interface 670, and/or the like) may receive the power from a battery of the user device, as described above.

As shown in FIG. 7, process 700 may include providing the power to the transaction card to charge a battery of the transaction card via a charging terminal of the charging device (block 750). For example, the charging device (e.g., using processor 620, output component 660, communication interface 670, and/or the like) may provide the power to the transaction card to charge a battery of the transaction card via a charging terminal of the charging device, as described above.

Process 700 may include additional implementations, such as any single implementation or any combination of implementations described below and/or in connection with one or more other processes described elsewhere herein.

In some implementations, the charging device is included within a case that holds the user device. In some implementations, detecting the transaction card is received within the charging slot may include identifying that an integrated circuit (IC) chip of the transaction card is in contact with the charging terminal of the charging device, and detecting the transaction card is received within the charging slot of the charging device based on identifying that the IC chip is in contact with the charging terminal. In some implementations, detecting the transaction card is received within the charging slot may include identifying that one or more contacts of the transaction card is in contact with the charging terminal of the charging device and detecting the transaction card is received within the charging slot of the charging device based on identifying that the one or more contacts of the transaction card are in contact with the charging terminal. In some implementations, an integrated circuit (IC) chip of the transaction card is powered by the power provided to the transaction card.

In some implementations, the user device may include a mobile phone, a personal digital assistant, a digital music player, or a gaming console. In some implementations, the charging jack is configured to be inserted into the device interface of the user device when the user device is inserted within a case of the charging device, wherein the case of the charging device is configured to hold the user device.

In some implementations, the charging device may determine that an amount of power in the battery of the transaction card is less than a second threshold level, wherein the user device is requested to provide the power to charge the transaction card based on determining that the amount of power in the battery of the transaction card is less than the second threshold level. In some implementations, the charging device, after providing the power to the transaction card, may determine that an amount of power in the battery of the transaction card satisfies a second threshold level and cease providing the power to the transaction card.

In some implementations, the power is provided to the transaction card via an integrated circuit (IC) chip of the transaction card that is in contact with the charging terminal.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 associated with a battery charger for a transaction card. In some implementations, one or more process blocks of FIG. 8 may be performed by a charging device (e.g., charging device 520). In some implementations, one or more process blocks of FIG. 8 may be performed by another device or a group of devices separate from or including charging device (e.g., charging device 520), such as a transaction card (e.g., transaction card 510), a user device (e.g., user device 530), and a backend system (e.g., backend system 550).

As shown in FIG. 8, process 800 may include detecting that a transaction card is received within the charging slot (block 810). For example, the charging device (e.g., using processor 620, input component 650, communication interface 670, and/or the like) may detect that a transaction card is received within the charging slot, as described above.

As shown in FIG. 8, process 800 may include drawing power from a battery of the user device to provide power to the transaction card (block 820). For example, the charging device (e.g., using processor 620, input component 650, communication interface 670, and/or the like) may draw power from a battery of the user device to provide power to the transaction card, as described above.

As shown in FIG. 8, process 800 may include providing the power to the transaction card via an integrated circuit (IC) chip that is in contact with the charging terminal (block 830). For example, the charging device (e.g., using processor 620, memory 630, storage component 640, input component 650, output component 660, communication interface 670, and/or the like) may provide the power to the transaction card via an integrated circuit (IC) chip that is in contact with the charging terminal, as described above.

Process 800 may include additional implementations, such as any single implementation or any combination of implementations described below and/or in connection with one or more other processes described elsewhere herein.

In some implementations, the charging device may include a charger battery and the charging device may, prior to drawing power from the battery of the user device, determine that an amount of remaining power in the charger battery is less than a threshold level and draw power from the battery of the user device based on determining that the amount of remaining power in the charger battery is less than the threshold level. In some implementations, the user device is a mobile phone. In some implementations, the IC chip includes one or more contacts configured to provide the power to one or more components of the transaction card.

In some implementations, the charging device may request, via the charging jack, the user device to provide the power to charge the transaction card, wherein the battery provides power to one or more components of the user device. In some implementations, the charging device may determine that an amount of power remaining in a battery of the transaction card is less than a threshold level and draw the power from the battery based on determining that the amount of power remaining in the battery of the transaction card is less than the threshold level. In some implementations, the charging device, when detecting that the transaction card is received within the charging slot, may identify that the integrated circuit (IC) chip of the transaction card is in contact with the charging terminal based on a change in resistance between a supply contact and a ground contact of the charging terminal and detect the transaction card is received within the charging slot based on identifying that the IC chip is in contact with the charging terminal.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a flow chart of an example process 900 associated with a battery charger for transaction card. In some implementations, one or more process blocks of FIG. 9 may be performed by a charging device (e.g., charging device 520). In some implementations, one or more process blocks of FIG. 9 may be performed by another device or a group of devices separate from or including charging device (e.g., charging device 520), such as a transaction card (e.g., transaction card 510), a user device (e.g., user device 530), and a backend system (e.g., backend system 550).

As shown in FIG. 9, process 900 may include detecting a transaction card is received within a charging slot when an integrated circuit (IC) chip of the transaction card is in contact with a charging terminal (block 910). For example, the charging device (e.g., using processor 620, input component 650, communication interface 670, and/or the like) may detect a transaction card is received within a charging slot when an integrated circuit (IC) chip of the transaction card is in contact with a charging terminal, as described above.

As shown in FIG. 9, process 900 may include requesting a user device to provide power to charge the transaction card via the charging terminal, wherein the user device is communicatively coupled to the charging terminal (block 920). For example, the charging device (e.g., using processor 620, component 660, communication interface 670, and/or the like) may request a user device to provide power to charge the transaction card via the charging terminal, wherein the user device is communicatively coupled to the charging terminal, as described above.

As shown in FIG. 9, process 900 may include receiving the power from the user device (block 930). For example, the charging device (e.g., using processor 620, input component 650, communication interface 670, and/or the like) may receive the power from the user device, as described above.

As shown in FIG. 9, process 900 may include providing the power to the transaction card to charge a battery of the transaction card (block 940). For example, the charging device (e.g., using processor 620, output component 660, communication interface 670, and/or the like) may provide the power to the transaction card to charge a battery of the transaction card, as described above.

Process 900 may include additional implementations, such as any single implementation or any combination of implementations described below and/or in connection with one or more other processes described elsewhere herein.

In some implementations, the charging device may detect that the transaction card has been removed from the charging slot based on the IC chip not being in contact with the charging terminal and send a notification to the user device that the transaction card has been removed from the charging slot to enable the user device to stop providing power. In some implementations, the notification is configured to cause the user device to alert, via a user interface of the user device, that the transaction card has been removed. In some implementations, the notification is configured to cause the user device to alert a security system that is to disable a function of the transaction card unless the transaction card is returned to the charging slot within a threshold period of time.

In some implementations, the charging device may detect that the transaction card has been removed from the charging slot based on the IC chip not being in contact with the charging terminal and, after a threshold period of time, send a notification to a security system to cause the security system to disable a function of the transaction card. In some implementations, the user device is held within a user device case that includes one or more processors of the charging device.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Accordingly, as described herein, a charging device may charge a transaction card when the transaction card is within a charging slot of the charging device. The charging device may enable a battery of the transaction card to be charged between transactions at transaction terminals. Furthermore, in some implementations, the charging device may notify a user device and/or security system that the transaction card has been removed from the charging device. As such, the user device and/or security system may determine that the transaction card is missing and/or disable one or more functions of the transaction card to prevent any unauthorized use of the transaction card.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   detecting, via a charging device, a transaction card is received within a charging slot;
   determining, via the charging device, that an amount of remaining power in a charger battery is less than a first threshold level;
   requesting, via the charging device, a user device to provide power to charge the transaction card based on determining the amount of remaining power in the charger battery is less than the first threshold level,
      wherein the user device is communicatively coupled to the charging device via a device interface of the user device and a charging jack of the charging device;
   receiving, via the charging device, the power from a battery of the user device; and
   providing, via the charging device, the power to the transaction card to charge a battery of the transaction card via a charging terminal of the charging device.

2. The method of claim 1, wherein the charging device is included within a case that holds the user device.

3. The method of claim 1, wherein detecting the transaction card is received within the charging slot comprises:
   identifying that an integrated circuit (IC) chip of the transaction card is in contact with the charging terminal of the charging device; and
   detecting the transaction card is received within the charging slot of the charging device based on identifying that the IC chip is in contact with the charging terminal.

4. The method of claim 1, wherein detecting the transaction card is received within the charging slot comprises:
   identifying that one or more contacts of the transaction card is in contact with the charging terminal of the charging device; and
   detecting the transaction card is received within the charging slot of the charging device based on identifying that the one or more contacts of the transaction card are in contact with the charging terminal,
      wherein an integrated circuit (IC) chip of the transaction card is powered by the power provided to the transaction card.

5. The method of claim 1, wherein the charging jack is configured to be inserted into the device interface of the user device when the user device is inserted within a case of the charging device,
   wherein the case of the charging device is configured to hold the user device.

6. The method of claim 1, further comprising:
   determining that an amount of power in the battery of the transaction card is less than a second threshold level,
      wherein the user device is requested to provide the power to charge the transaction card based on determining that the amount of power in the battery of the transaction card is less than the second threshold level.

7. The method of claim 1, further comprising:
   after providing the power to the transaction card, determining that an amount of power in the battery of the transaction card satisfies a second threshold level; and
   ceasing providing the power to the transaction card.

8. The method of claim 1, wherein the power is provided to the transaction card via an integrated circuit (IC) chip of the transaction card that is in contact with the charging terminal.

9. A charging device, comprising:
   a charging slot;
   a charging terminal;
   a user device holder to hold a user device;
   a charging jack that is to be inserted within a device interface of the user device when the user device is in the user device holder;
   one or more memories; and
   one or more processors, communicatively coupled to the one or more memories, to:
      detect that a transaction card is received within the charging slot;
      draw power from a battery of the user device to provide power to the transaction card; and
      provide the power to the transaction card via an integrated circuit (IC) chip that is in contact with the charging terminal.

10. The charging device of claim 9, further comprising a charger battery,
   wherein the one or more processors are to:
      prior to drawing power from the battery of the user device, determine that an amount of remaining power in the charger battery is less than a threshold level; and
      draw power from the battery of the user device based on determining that the amount of remaining power in the charger battery is less than the threshold level.

11. The charging device of claim 9, wherein the IC chip includes one or more contacts configured to provide the power to one or more components of the transaction card.

12. The charging device of claim 9, wherein the one or more processors are further to:
   request, via the charging jack, the user device to provide the power to charge the transaction card,
      wherein the battery provides power to one or more components of the user device.

13. The charging device of claim 9, wherein the one or more processors are further to:
   determine that an amount of power remaining in a battery of the transaction card is less than a threshold level; and
   draw the power from the battery based on determining that the amount of power remaining in the battery of the transaction card is less than the threshold level.

14. The charging device of claim 9, wherein the one or more processors, when detecting that the transaction card is received within the charging slot, are to:
   identify that the integrated circuit (IC) chip of the transaction card is in contact with the charging terminal based on a change in resistance between a supply contact and ground contact of the charging terminal; and
   detect the transaction card is received within the charging slot based on identifying that the IC chip is in contact with the charging terminal.

15. A non-transitory computer-readable medium storing instructions, the instructions comprising:
   one or more instructions that, when executed by one or more processors, cause the one or more processors to:
      detect a transaction card is received within a charging slot when an integrated circuit (IC) chip of the transaction card is in contact with a charging terminal;
      request a user device to provide power to charge the transaction card via the charging terminal,
         wherein the user device is communicatively coupled to the charging terminal;
      receive the power from the user device; and
      provide the power to the transaction card to charge a battery of the transaction card.

16. The non-transitory computer-readable medium of claim 15, wherein the one or more instructions, when executed by the one or more processors, further cause the one or more processors to:
   detect that the transaction card has been removed from the charging slot based on the IC chip not being in contact with the charging terminal; and
   send a notification to the user device that the transaction card has been removed from the charging slot to enable the user device to stop providing power.

17. The non-transitory computer-readable medium of claim 16, wherein the notification is configured to cause the user device to alert, via a user interface of the user device, that the transaction card has been removed.

18. The non-transitory computer-readable medium of claim 16, wherein the notification is configured to cause the user device to alert a security system that is to disable a function of the transaction card unless the transaction card is returned to the charging slot within a threshold period of time.

19. The non-transitory computer-readable medium of claim 15, wherein the one or more instructions, when executed by the one or more processors, further cause the one or more processors to:
   detect that the transaction card has been removed from the charging slot based on the IC chip not being in contact with the charging terminal; and
   after a threshold period of time, send a notification to a security system to cause the security system to disable a function of the transaction card.

20. The non-transitory computer-readable medium of claim 15, wherein the user device is held within a user device case that includes the one or more processors.

* * * * *